United States Patent [19]

Takahashi

[11] Patent Number: 5,676,441
[45] Date of Patent: Oct. 14, 1997

[54] PROJECTOR

[75] Inventor: Hitoshi Takahashi, Chiba, Japan

[73] Assignee: Sony Corporation, Tokyo, Japan

[21] Appl. No.: 692,517

[22] Filed: Aug. 5, 1996

[30]     Foreign Application Priority Data

Aug. 11, 1995  [JP]  Japan .................................. 7-226071

[51] Int. Cl.⁶ ...................................... G03B 21/56
[52] U.S. Cl. ................... 353/94; 359/460; 353/74
[58] Field of Search ....................... 353/94, 74; 359/460, 359/456, 453, 449

[56]            References Cited

U.S. PATENT DOCUMENTS

| | | | |
|---|---|---|---|
| 5,213,217 | 5/1993 | Galton | 209/399 |
| 5,249,005 | 9/1993 | Furno | 359/460 |
| 5,382,990 | 1/1995 | Hata et al. | 359/460 |
| 5,512,968 | 4/1996 | Hagiwara et al. | 353/94 |
| 5,548,350 | 8/1996 | Yamada et al. | 359/460 |
| 5,580,145 | 12/1996 | Yamada et al. | 359/460 |

FOREIGN PATENT DOCUMENTS

| | | |
|---|---|---|
| 0623839 | 11/1994 | European Pat. Off. . |
| 5173251 | 7/1993 | Japan . |
| 6075300 | 3/1994 | Japan . |

*Primary Examiner*—William Dowling
*Attorney, Agent, or Firm*—Jay H. Maioli

[57]            ABSTRACT

A projector includes a plurality of cabinets arranged in rows and columns and each of the cabinets has a screen located at its front end with a plurality of the screens being adapted to collectively form a large display screen on which an image is formed. The cabinet further includes a screen a screen frame for holding edges of the screen, a screen holder, which is secured to the screen by the screen frame, a screen bracket for mounting the screen holder to the cabinet, a mechanism for securing the screen holder to the screen bracket and permitting disconnection of the screen holder from the screen bracket when the screen holder is pushed rearwardly toward the screen bracket, and a slide mechanism mounted on one side of the screen bracket and the screen holder and adapted to permit reciprocal movement of the screen holder relative to the cabinet when the screen holder is disconnected from the screen bracket.

6 Claims, 11 Drawing Sheets

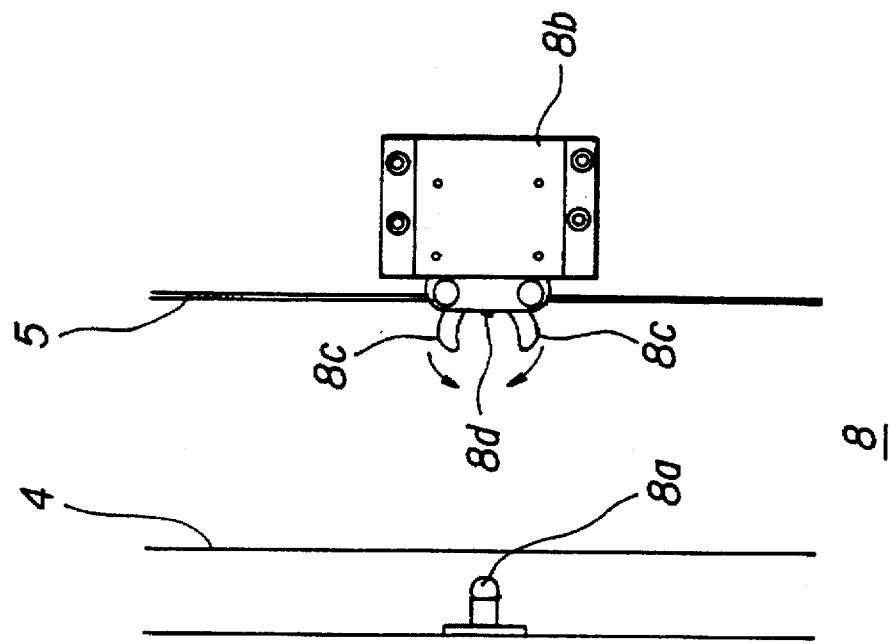
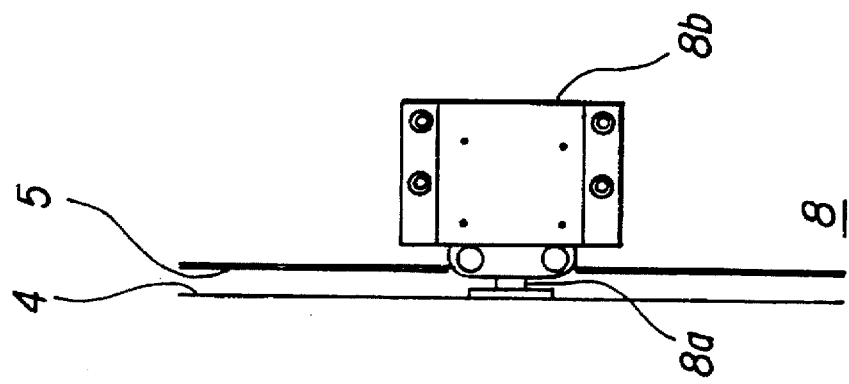

PROJECTOR

FIELD OF THE INVENTION

The present invention relates to a multi-screen projector and more particularly, to a projector which allows ready and separate removal of each of a plurality of screens from a screen block.

BACKGROUND OF THE INVENTION

To form a large image in an inside or outside hall, there has been proposed a projector with a plurality of screens.

Typically, a multi-screen projector includes a plurality of screen blocks arranged in rows and columns, for example, three screen blocks x three screens blocks. The screen block is provided at a front end with a screen and a plurality of the screens are adapted to collectively form a large display screen the large display screen being formed by (a total of 9 screens when three screen blocks are arranged in both horizontal and vertical directions, or a total of 16 screens when four screen blocks are arranged in both horizontal and vertical directions).

A cathode ray tube (CRT) is housed in each of the screen blocks. An image is projected from the CRT and directed to each screen. A plurality of screens can thus form a single large display screen on which an image is formed.

Conventionally, a screen frame, shaft and other elements are used to releasably mount a screen to the front of each screen block.

When it is necessary to replace or clean a given screen, only that screen is moved forwardly from the cabinet as disclosed in Japanese laid-open patent publication No. Heisei 5-173251.

FIG. 1 is a vertical sectional view, taken on the line 1—1 in FIG. 2, of a screen block as part of a multi-screen projector shown in Japanese laid-open patent publication No. Heisei 5-173251. FIG. 2 is a front view of the screen block. FIG. 3 is a top plan view of the screen block as seen in the direction of the arrow B. FIG. 4 is an enlarged view showing the principal part of a transfer mechanism included in a screen frame shown at the left end of FIG. 1. FIG. 5 is a perspective view of a portion of the screen frame mounted on the front end of the transfer mechanism of the screen frame shown in FIG. 4 and adapted to hold a screen. FIG. 6 is a schematic view, in perspective, of the multi-screen projector.

As shown best in FIG. 6, a multi-screen projector 30 is composed of nine rectangular screen blocks 32, three in a horizontal direction and three in a vertical direction. Each of the screen blocks 32 is provided with a screen 32A, with a plurality of the screens 32A being combined on the same plane to form a large display screen 34.

FIGS. 1 and 2 show the screen block 32. FIG. 1 is a sectional view taken on the line 1—1 in FIG. 2. FIG. 2 is a front view of the screen block.

As shown in side elevation in FIG. 1, each of the screen blocks 32 includes a cathode ray tube (CRT) 38 for projecting an image. An enclosure assembly 36 is provided in front of the CRT 38 to direct the projected light beam to the screen 32A. A screen block body 40 forms the outer profile of the screen block 32. The enclosure assembly 36 is fixed to the screen block body 40.

The screen 32A is held in position by a screen frame 64 and moved from (in the direction of the arrow X in FIG. 1) and toward the screen block body 40 by means which will later be described.

As shown in plan in FIG. 3, a pair of opposite base plates 42 are fixed to the front end of the screen block body 40. As shown, on an enlarged scale, in FIG. 4, a pair of upper bearings and another pair of lower bearings 43, 43 are mounted on the base plates 42. A shaft 46 is provided slidably in the axial direction through the bearings 43. A rod or slider 44 is connected to the rear end of the shaft 46. The shaft 46 and the slider 44 jointly form a means for moving the screen 32A and the screen frame in a reciprocal manner.

An unlocking member 48 is fixed to the center of the slider 44 and extends toward the screen 32A. The unlocking member 48 is guided by a guide block 51 fixed to the base plate 42 and can be moved with the slider 44 against the screen block 32.

A roller 62 is mounted at the center of the base plate 42. One end of a drive wire 52 extends along half of the circumference of the roller 62 and is made to return and then be fixed to the rear end of the slider 44 or the unlocking member 48. Thus, by pulling the other end of the drive wire 52, the slider 44 is moved, with the unlocking member 48 and the shaft 46, in a forward direction toward the base plate 42.

As is clear from FIG. 3, the two base plates 42 provided at the front of the screen block body 40 are associated with the slider 44. This arrangement requires a pair of drive wires 52. A common take-up tool 54 is used to take up the two drive wires 52, 52. To this end, rollers 58 are provided to be engaged with one of the two drive wires 52. The rear end of each of the drive wires 52, 52 is connected to the take-up tool 54 which is located at the rear of the screen block body 40.

A lock mechanism will be described with reference to FIG. 4.

When the slider 44 is moved to a fully retracted position, the screen frame 64 and the screen 32A connected to the shafts 46 via their front ends are positioned such that an image is formed on the screen 32A. To limit movement of the screen frame 64, a locking member 50 is attached to the center of the base plate 42 and is pivotable about a pivot pin 50A. The locking member 50 has a projection. When the unlocking member 48 is moved to a fully retracted position, the projection of the locking member 50 is engaged with a taper surface 48A of the unlocking member 48. A spring is associated with the locking member 50 to constantly press the taper surface 48A.

As shown in FIG. 1, a handle 56 is attached to the take-up tool 54. When the handle 56 is rotated, the take-up tool 54 is operated to simultaneously take up the drive wires 52, 52. This causes forward movement of the sliders 44. At the same time, the locking member 48 is moved in a forward direction so that the locking member 50 is moved down along the taper surface 48A to unlock the locking member 50.

The front end of the shaft 46 projects forwardly from the base plate 42 as the sliders 44 are moved.

As shown in FIG. 5, the front end of the shaft 46 is fixed to the screen frame 64. The screen frame 64 is composed of an outer screen frame 64A and an inner screen frame 64B. The outer screen frame 64A is shaped to surround the screen 32A.

The outer screen frame 64A and the inner screen frame 64B have threaded holes 66 into which screws 68 are driven to provide a connection between the outer screen frame 64A and the inner screen frame 64B and to hold the screen 32A. The screen 32A is composed, for example, of a Fresnel lens and a lenticular lens. A sleeve 70 is attached to the rear edge of the inner screen frame 64B. The shaft 46 is inserted into the sleeve 70 and is axially moved with the screen frame 64.

As shown best in FIG. 6, the multi screen projector consists of three rows and columns of the screen blocks 32 and may be extended in either direction. The screens 32A of these screen blocks 32 are assembled on the same plane to form a large display screen 34.

When a particular screen 32A becomes dirty or damaged, an operator stretches his hand behind the screen block 32 to rotate the handle 56 for taking up the drive wires 52, 52. This causes advancement of the sliders 44.

As the sliders 44 are advanced, the shafts 46 are axially moved in a forward direction to thereby move the screen frame 64 away from the screen block body 40. As a result, the screws 68 of the outer screen frame 64A are subject to exposure. The operator is then able to remove the screws 68 so as to replace or clean the dirty or damaged screen 32A.

In the related art multi-screen projector, however, the operator must stretch his hand behind the projector in order to rotate the handle 56 in order to handle the screen arranged in front of the projector. Handling the screen in this way is cumbersome and time-consuming.

A plurality of operators are required to smoothly replace and clean the screens. This results in an increase in the labor cost.

Moreover, to mount the screen 32A, it is necessary to first hold the screen 32A by the screen frames 64A, 64B and thereafter, attach the screen to the front end of the shaft 46. This deteriorates operating efficiency.

SUMMARY OF THE INVENTION

It is an object of the present invention to provide a projector which is easy to maintain.

According to the present invention, a projector includes a plurality of cabinets arranged in rows and columns and each of the cabinets has a screen located at the front end with a plurality of the screens being adapted to collectively form a large display screen on which an image is formed. The cabinet further includes a screen frame for holding edges of the screen to secure the screen to a screen holder, a screen bracket for mounting the screen holder to the cabinet, means for securing the screen holder to the screen bracket and permitting disconnection of the screen holder from the screen bracket when the screen holder is pushed rearwardly toward the screen bracket, and a slide mechanism mounted on one side of the screen bracket and the screen holder and adapted to permit reciprocal movement of the screen holder relative to the cabinet when the screen holder is disconnected from the screen bracket.

BRIEF DESCRIPTION OF THE DRAWINGS

The present invention will now be described by way of example with reference to the accompanying drawings, in which:

FIGS. 11A and 11B are enlarged views of the push-type joint for use in the projector;

DETAILED DESCRIPTION OF THE INVENTION

Figure 7:
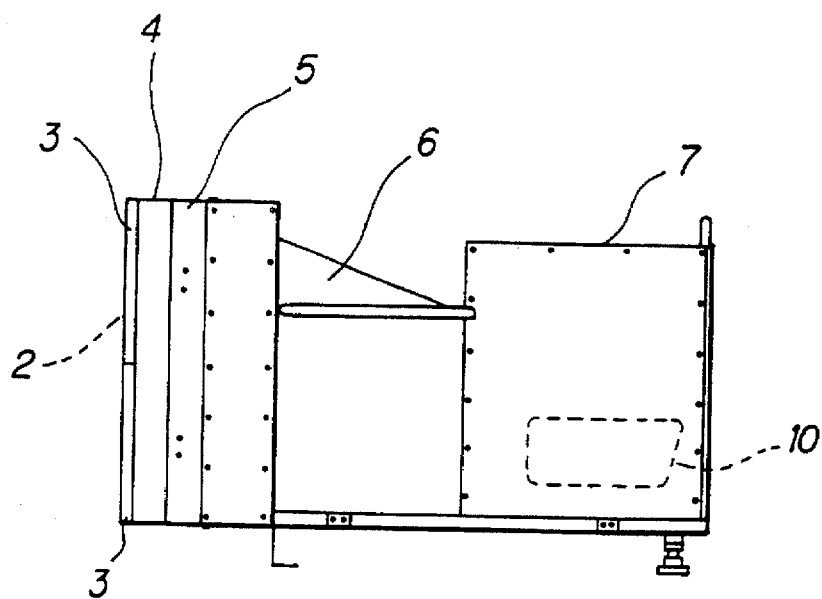
FIG. 7 is a side elevational view of a projector according to one embodiment of the present invention.
Figure 8:
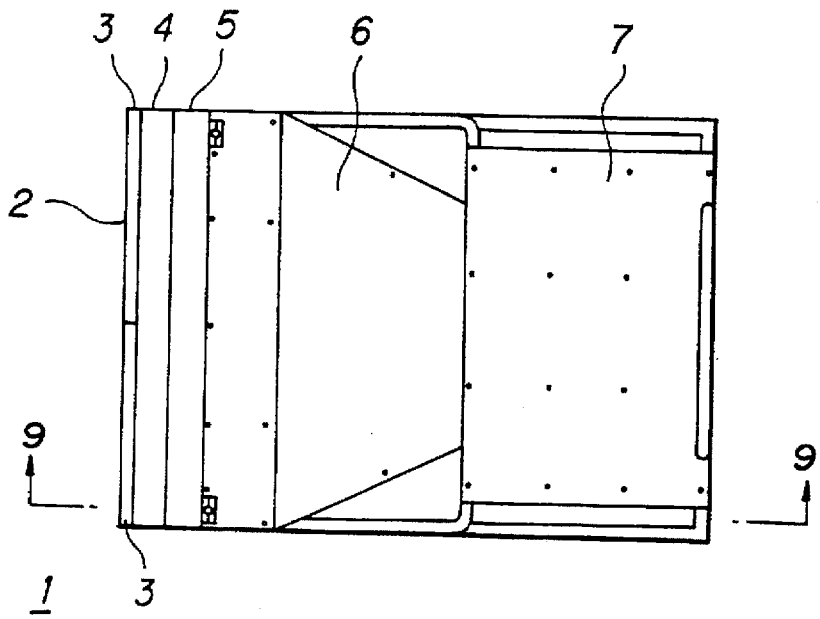
FIG. 8 is a top plan view of the projector shown in FIG. 7.

FIG. 7 is a side view of a projector assembled according to one embodiment of the present invention. FIG. 8 is a top plan view of the projector.

Figure 6:
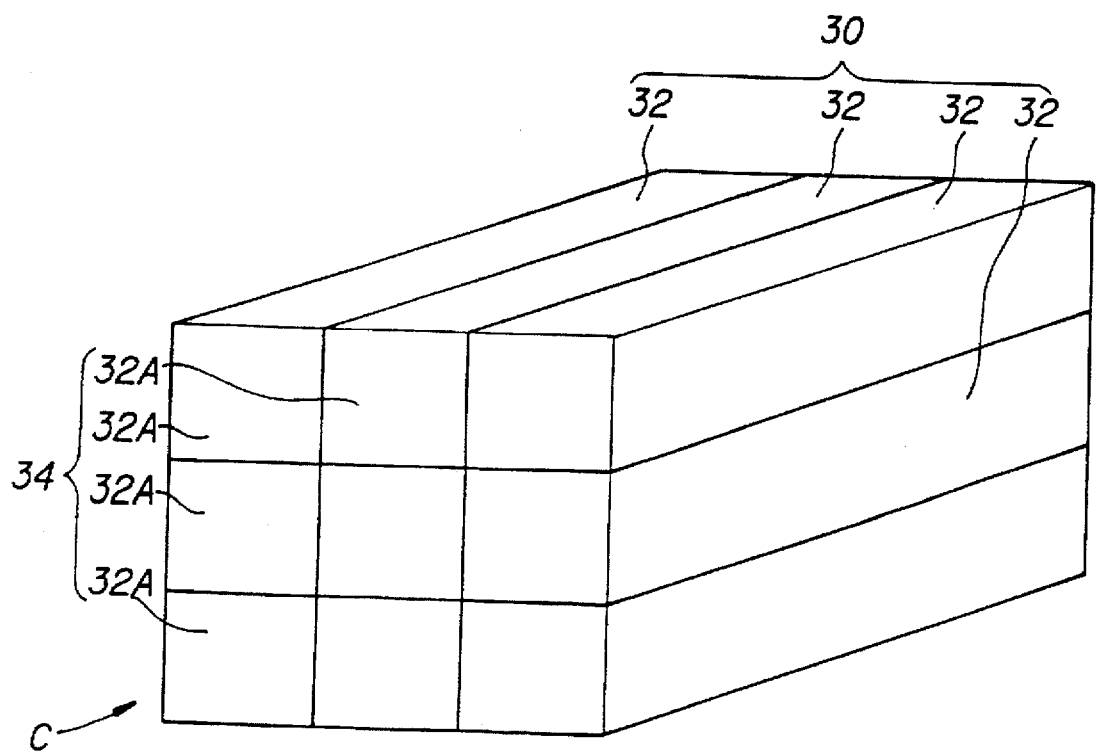
FIG. 6 is a schematic view showing an example of the overall structure of a multi-screen projector with three cabinets arranged adjacent to each other in both horizontal and vertical directions.

As described earlier with reference to FIG. 6, the projector includes nine cabinets 1, illustratively three in a vertical direction and three in a horizontal direction, adapted to collectively form a large display screen.

A screen 2 is provided at the front of each of the cabinets 1 and is composed, for example, of a Fresnel lens and a lenticular lens. A plurality of screen frames 3 are disposed around the screen 2, two in each side of the screen. The screen frames 3 are screwed to a screen holder 4 with screen retainers at the front ends of the screen frames 3 holding four edges of the screen 2 as will be described later. A method for securing the screen 2 by the screen frames 3 will later be described with reference to FIGS. 15 to 17.

The screen holder 4 is in the form of a frame and has a central opening. With the screen 2 held in position by the screen frames 3, the screen holder 4 is moved toward and away from the cabinet 1 through a slide mechanism which will later be described. That is, the slide mechanism is slid in a forward direction to permit replacement of or disassembly of screens for cleaning purposes.

Like the screen holder 4, a screen bracket 5 is located forwardly of the cabinet 1. As shown in FIGS. 7 and 8, the screen bracket 5 normally holds the screen holder 4.

A push-type joint is used to secure the screen holder 4 and the screen bracket 5 together, as will be described later. The screen holder 4 is pushed rearwardly toward the screen bracket 5 to allow for ready connection and disconnection of these two elements.

Figure 1:
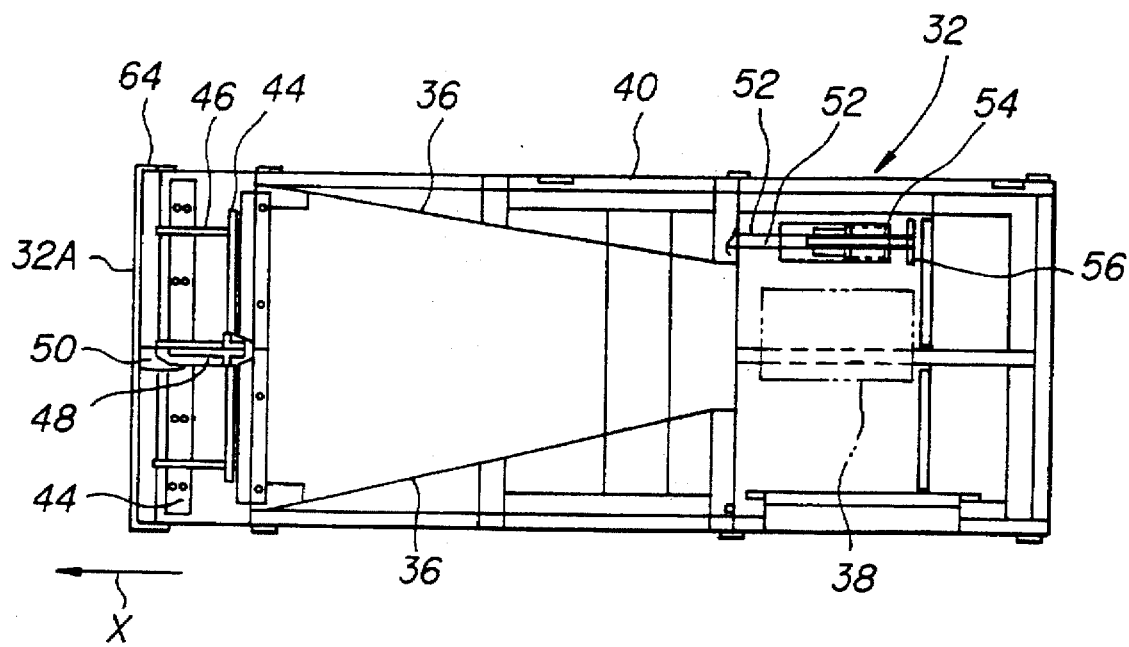
FIG. 1 is a sectional view of a conventional projector.
Figure 2:
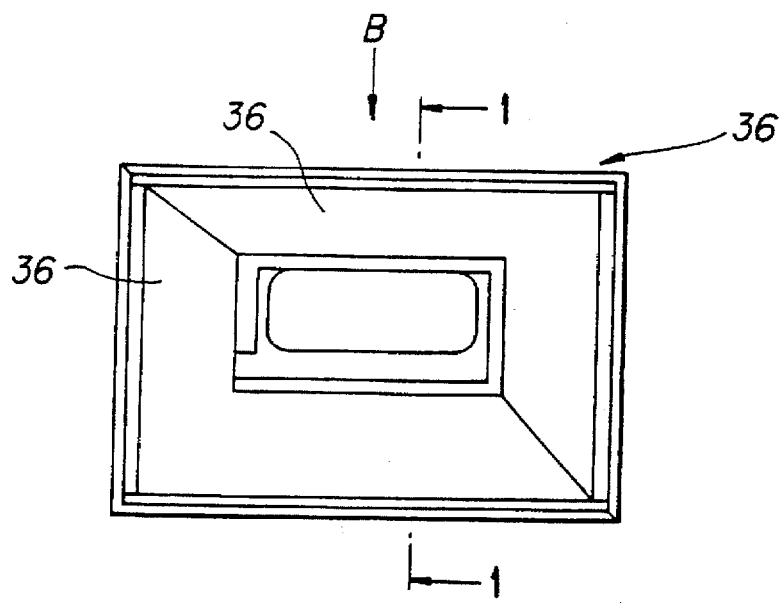
FIG. 2 is a front view of the projector shown in FIG. 1.
Figure 3:
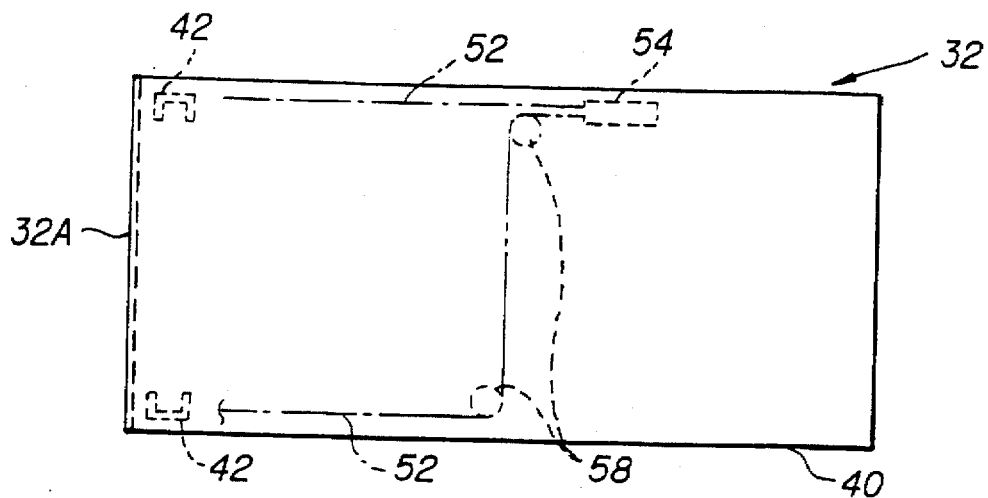
FIG. 3 is a plan view of the projector as seen in the direction of the arrow B in FIG. 2.
Figure 4:
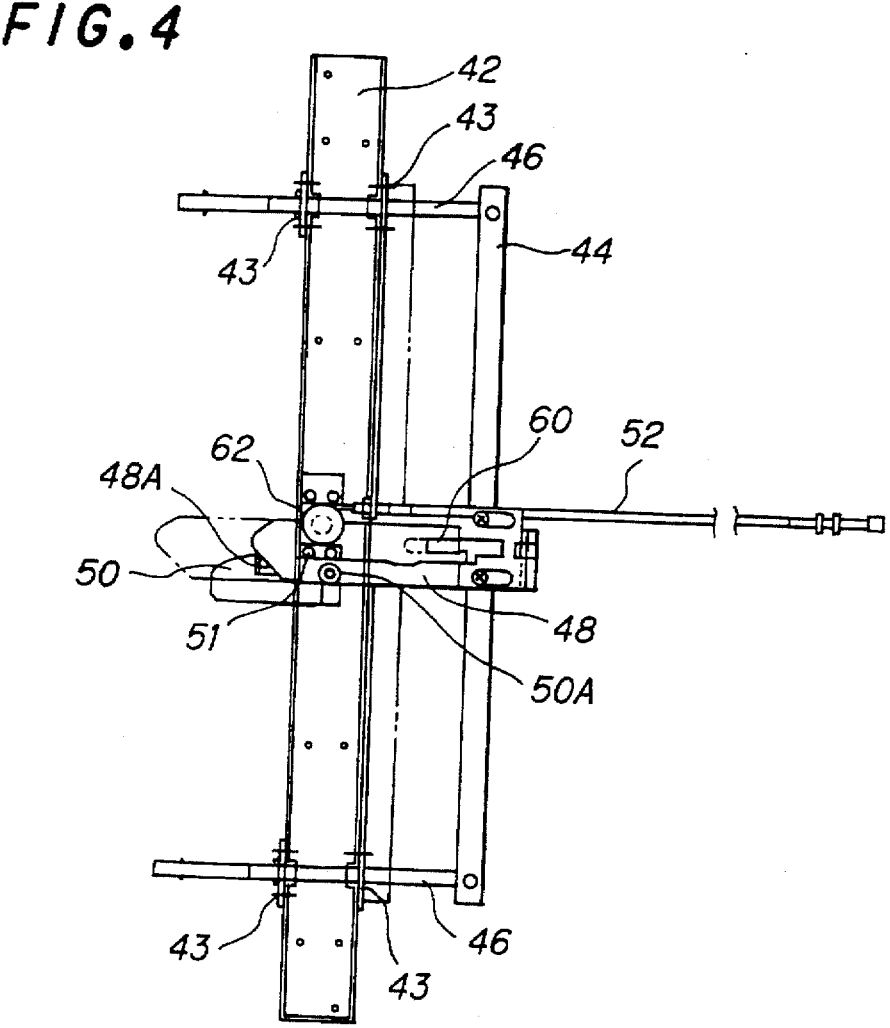
FIG. 4 shows a slide mechanism for use in a conventional screen frame.
Figure 5:
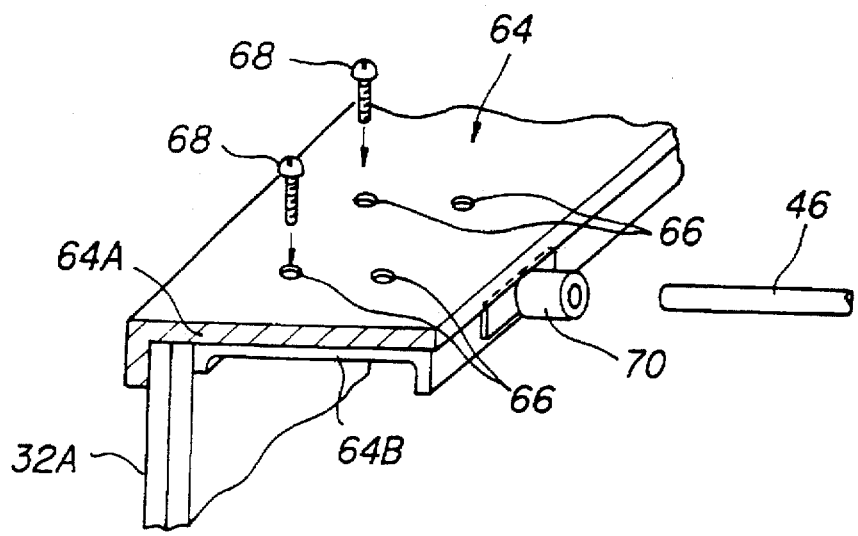
FIG. 5 is a perspective view of a portion of the screen frame.

Like the enclosure assembly 36 shown in FIG. 1, an enclosure 6 is adapted to direct a beam projected from a cathode ray tube 10 (shown in broken line), housed within the cabinet 1, to the screen 2. The enclosure 6 is secured to a frame and forms part of the cabinet 1.

A CRT container 7 contains the CRT 10 which provides three colors, namely red, green and blue, so as to form an image on the screen 2.

Reference will now be made to sliding movement of the screen holder 4.

Figure 9:
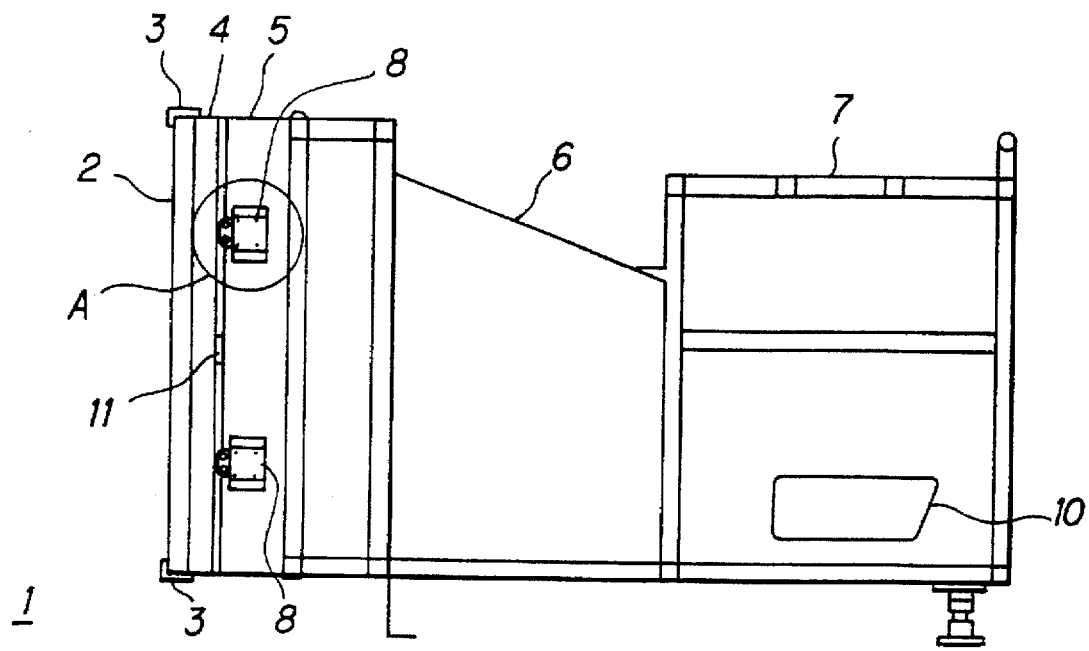
FIG. 9 is a sectional view of the projector with a slide mechanism and push-type joints.
Figure 10:
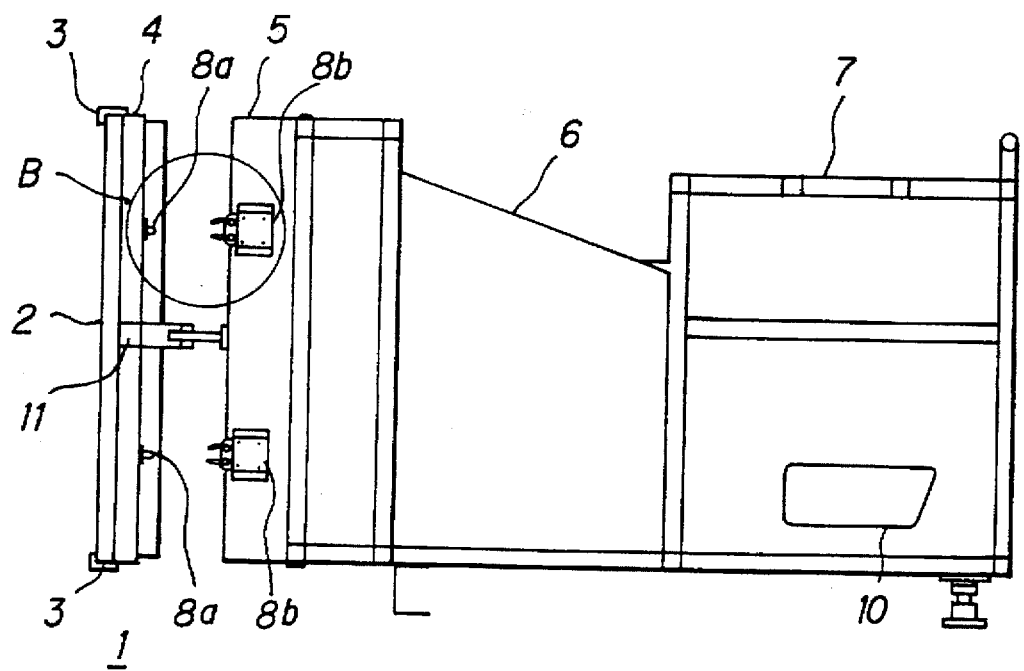
FIG. 10 is a sectional view of the projector with a slide mechanism and push-type joints.

FIGS. 9 and 10 are sectional views of the cabinet 1 taken on the line 9—9 of FIG. 8. FIG. 9 shows the screen holder 4 secured to the screen bracket 5. FIG. 10 shows the screen holder 4 as slid in the foward direction from the screen holder 4. FIG. 11A is an enlarged view of the joint encircled as at A in FIG. 9. FIG. 11B is an enlarged view of the Joint encircled as at B in FIG. 10.

Referring to FIG. 10, a slider 11 provides a connection between the screen holder 4 and the screen bracket 5 and includes a first fixed element, a second fixed element and a core disposed between the first and second fixed elements through bearings, as will later be described in more detail with reference to FIGS. 12 and 13A to 13C. The slider 11 permits sliding movement of the screen holder 4. As is clear from FIG. 10, the rear end of the screen holder 4 has a shorter circumference than the front end. The fixed elements of the slider 11 are attached to the rear end of the screen holder 4 and the inner front side of the screen bracket 5.

In the illustrated embodiment, a push-type joint 8 serves as a means for securing the screen holder 4 and the screen bracket 5 together and includes a projection 8a and a grip 8b. Illustratively, the projection 8a is attached to the screen holder 4, and the grip 8b is attached to the screen bracket 5. The push-type joint 8 is attached to the inner side of the screen bracket 5, but shown by solid line in FIG. 11A and 11B for purposes of convenience.

As shown in FIG. 11B, the grip 8b, which is attached to the screen bracket 5, includes a pair of hands 8c, 8c closable in the direction of the arrows and a control element 8d disposed between the two hands 8c, 8c and adapted to control opening and closing of the hands 8c, 8c. The projection 8a, which is attached to the screen holder 4, corresponds in position to the control element 8d and has a press element at its front end.

When the projection 8a presses the control element 8d, the two hands 8c, 8c are closed in the direction of the arrows in FIG. 11B. The projection 8a is further forced into the grip 8b and held in position when the two hands 8c, 8c fully closed. In other words, when the screen holder 4 is pushed into the screen bracket 5, the projection 8a is held by the two hands 8c, 8c within the grip 8b so as to secure the screen holder 4 to the screen bracket 5 and lock the screen holder 4 against forward movement.

To allow forward sliding movement of the screen holder 4, the screen holder 4 is further pushed, from a position shown in FIG. 9, against the screen bracket 5. This causes the projection 8b to press the control element 8d within the grip 9 so as to unlock the push-type joint 8.

Once the screen holder 4 is thus pushed into the screen bracket 5, the screen holder 4 is then moved in a reverse or forward direction to cause the two hands 8c, 8c to be opened or moved in a direction opposite to the direction of the arrows in FIG. 11B. The projection 8a is then moved away from the grip to allow for sliding movement of the screen holder 4.

The projection 8a may be attached to the screen bracket 5, and the grip 8b may be attached to the screen holder 4.

In this embodiment, the push-type Joint 8 serves as a securing means. Alternatively, a magnetic or other joints may serve as a securing means.

As shown, the rear end of the screen holder 4 is less in circumference than the front end of the screen holder 4 by an amount corresponding to the thickness of the slider 11. One of the fixed elements is attached to the side of the rear end of the screen holder 4. The other fixed element is attached to the inner front end of the screen bracket 5.

The upper and lower rear end of the screen holder 4 are fit in the front end of the screen bracket 5 to ensure connection of the screen holder 4 and the screen bracket 5.

Reference will next be made to the slider 11 designed for reciprocal movement of the screen holder 4.

Figure 12:
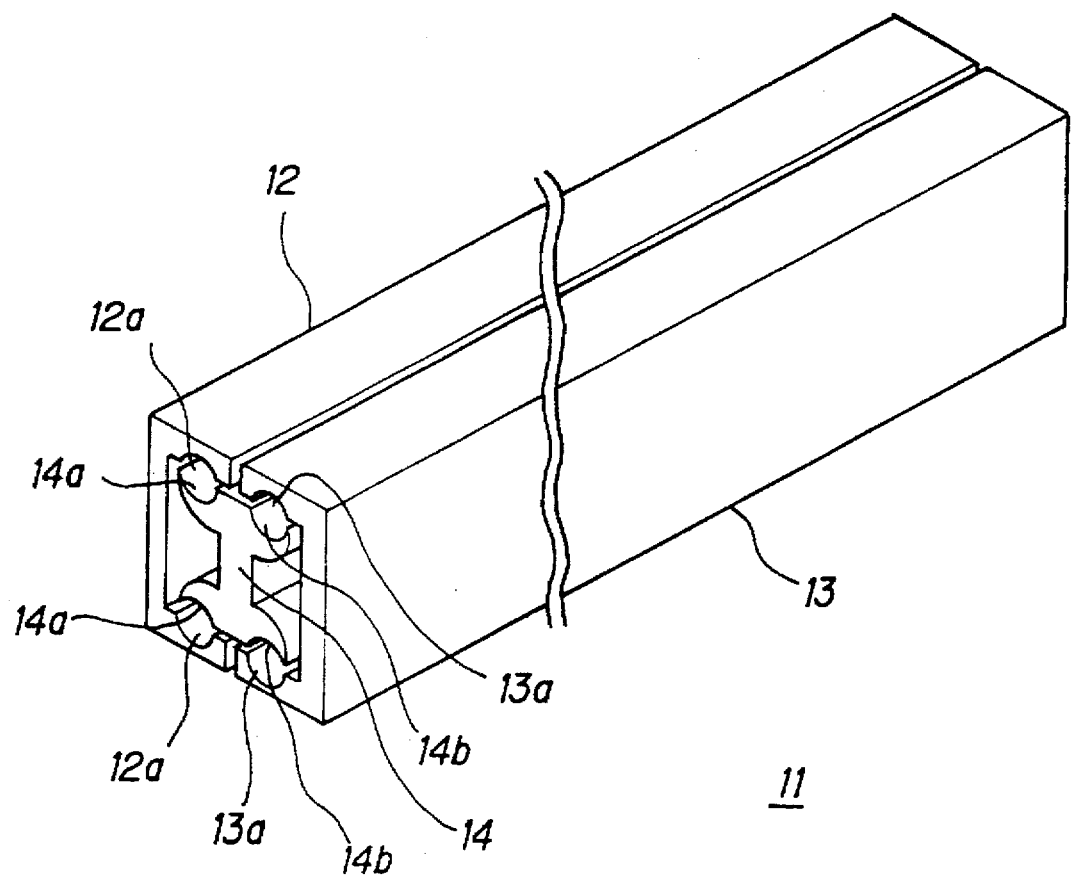
FIG. 12 is a perspective view showing the outer profile of a slider.

FIG. 12 is a perspective view showing the outer appearance of the slider 11.

The slider 11 includes a first fixed element 12, a second fixed element 13 and a core 14 disposed between the first fixed element 12 and the second fixed element 13. Specifically, the first fixed element 12 has a substantially C-shape and includes upper and lower arcuate grooves 12a, 12a. Similarly, the second fixed element 13 has a substantially C-shape and includes upper and lower arcuate grooves 13a, 13a. The core 14 includes a pair of grooves 14a, 14a corresponding in position to the grooves 12a, 12a, and a pair of grooves 14b, 14b corresponding in position to the grooves 12b, 12b.

Although not shown in FIG. 12, a plurality of bearings are disposed between the grooves 12a and 14a and between the grooves 13a and 14b so as to permit sliding movement between the first fixed element 12, the second fixed element 13 and the core 14. A plurality of stoppers are provided in the grooves 12a, 13a, 14a and 14b to limit movement of the bearings and thus, to stop the sliding movement of these elements. One of the fixed elements 12 and 13 is fixed to the screen holder 4, and the other element is fixed to the screen bracket 5.

Figure 13A:
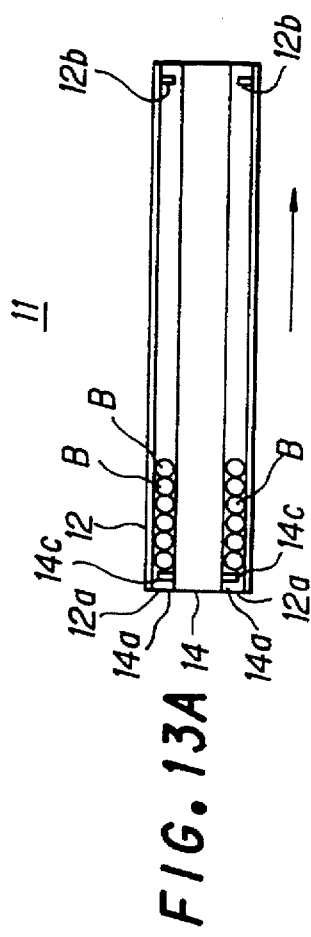
FIGS. 13A to 13C show the manner in which the slider is operated.
Figure 13B:
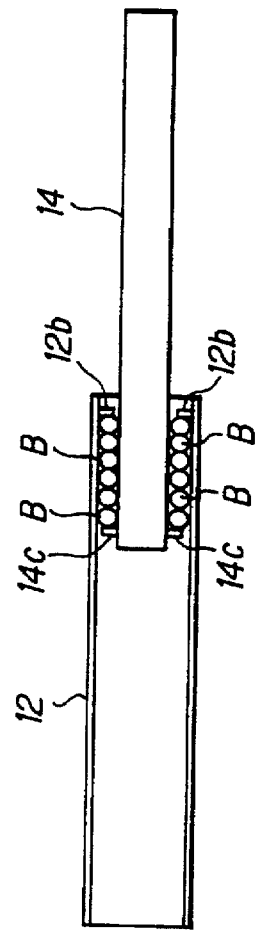
Figure 13C:
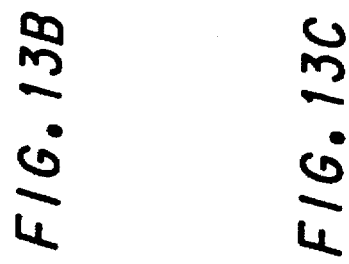

FIG. 13A to 13C are sectional views showing sliding movement of the slider 11 shown in FIG. 12.

FIG. 13A corresponds to the perspective view of the slider shown in FIG. 12, but the second fixed element 13 is not shown for purposes of convenience. As shown, a pair of stoppers 12b, 12b are provided in the grooves 12a, 12a of the first fixed element 12. Also, a pair of stoppers 14c, 14c are provided in the grooves 14a, 14a of the core. A plurality of bearings B are located within the grooves 12a, 14a between the stoppers 12b, 14c to smooth sliding movement of the second fixed element 13 and the core 14.

The core 14 is moved in the direction of the arrow in FIG. 13A while the bearings B are pushed by the stoppers 14c, 14C. The core 14 is stopped when the bearings B are brought into contact with the stoppers 12b, 12b.

Although not shown, additional stoppers are provided in the other end of the core 14 and the first fixed element 12 to prevent the core 14 from being moved out of the fixed element 12 in a direction opposite to the direction of the arrow in FIG. 13A.

FIG. 13C is a view similar to FIG. 13B, but additionally showing the manner in which sliding movement of the second fixed element 13 is stopped by the stoppers 14d, 14d of the core 14.

The second fixed element 13 is similar in structure to the first fixed element 12 as previously described. A pair of stoppers 13b, 13b are provided in the grooves 13a, 13a. A pair of stoppers 14d, 14d are also provided in the grooves 14b, 14b of the core 14. The bearings B are disposed between the stoppers 13b and 14d.

Thus, FIG. 13C shows the first and second fixed elements 12 and 13 slidably moved to a state in which the slider 11 is fully extended. Namely, the slider 11 can be extended from a state shown in FIG. 13A to a state shown in FIG. 13C.

The slider 11 shown in FIG. 13A is in the same state as that shown in FIG. 9. When the screen holder 4 is pushed toward the cabinet 1 so as to unlock the push-type joint 8, then the screen holder 4 is free to slide. As this occurs, the first fixed element 12, the second fixed element 13, and the core 14 are slid to be in a state shown in FIG. 10.

The slider 11 is used to permit sliding movement of the screen holder 4. To this end, the first fixed element 12 is fixedly connected to the screen holder 4, and the second fixed element 13 is fixedly connected to the screen bracket 5. There should be a slight looseness in this connection to facilitate locking/unlocking of the push-type joint 8.

Figure 14A:
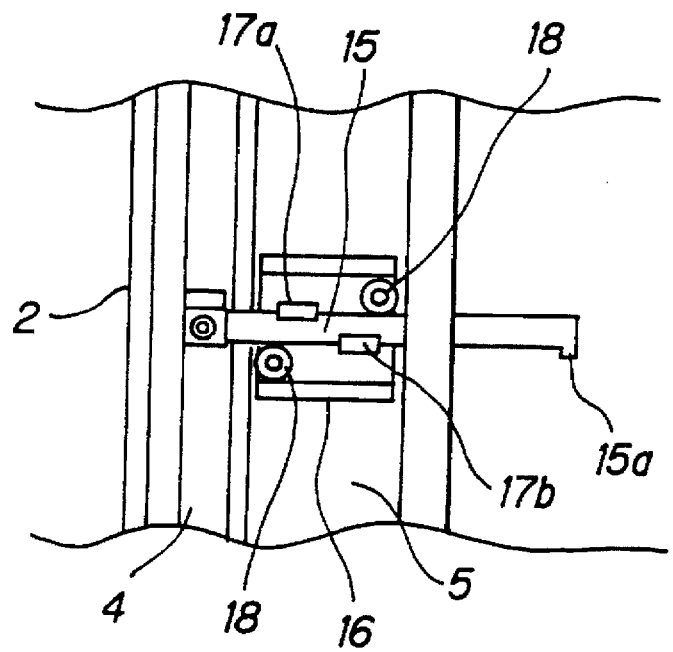
FIGS. 14A and 14B are enlarged views showing an alternative form of the slider for use in the projector.
Figure 14B:
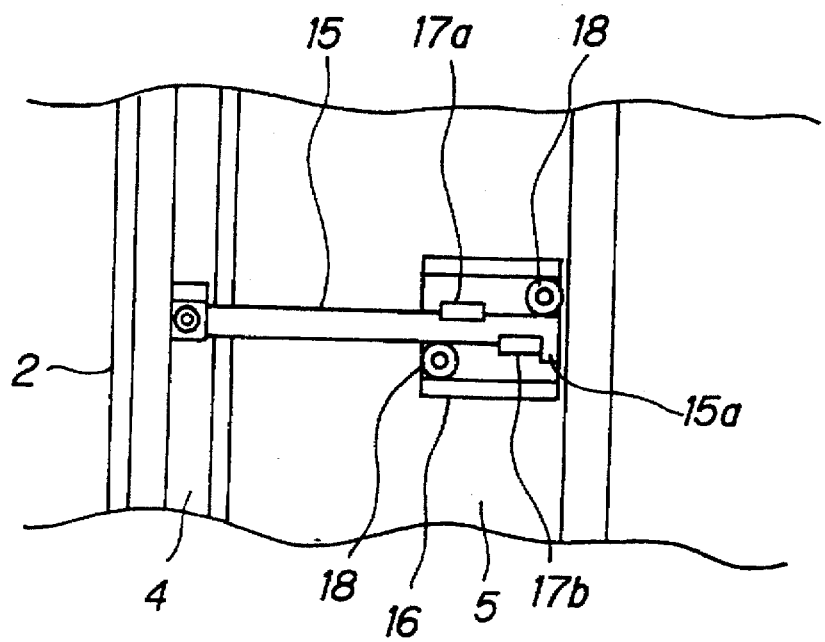

FIGS. 14A and 14B are enlarged views of another form of the slide mechanism. Specifically, a slide mechanism includes a bearing and a plurality of rollers.

As shown, a slider 16 includes a shaft 15 attached to either of the screen holder 4 and having a stopper 15a at its front end, a pair of bearings 17a, 17b adapted to hold the shaft 15 against the screen bracket 5, and a pair of guide rollers 18, 18. When the push-type joint 8 is moved to an unlocked position, the screen holder 4 is free to move in a forward direction. As this occurs, the shaft 15 is moved from a position shown in FIG. 14A to a position shown in FIG. 14B while it is being held by the bearings 17a, 17b. At this time, the stopper 15a is brought into the bearing 17b to prevent sliding movement or release of the screen holder 4.

As thus far described, according to the present invention, the slide mechanism, sliders 11 or 16, is attached to either side of the screen holder 4 and the screen bracket 5 to permit sliding movement of the screen holder 4. The slide mechanism is thus simple in structure.

A conventional slide mechanism was complicated since it required various elements such as shafts 46, drive wires 52, and rollers 62. In the present invention, however, the screen holder 4 can be slidable simply by attaching the slider 11 to either side of the screen holder 4 and the screen bracket 5.

Reference will now be made to the manner in which the screen 2 is mounted on the screen holder 4.

Figure 15:
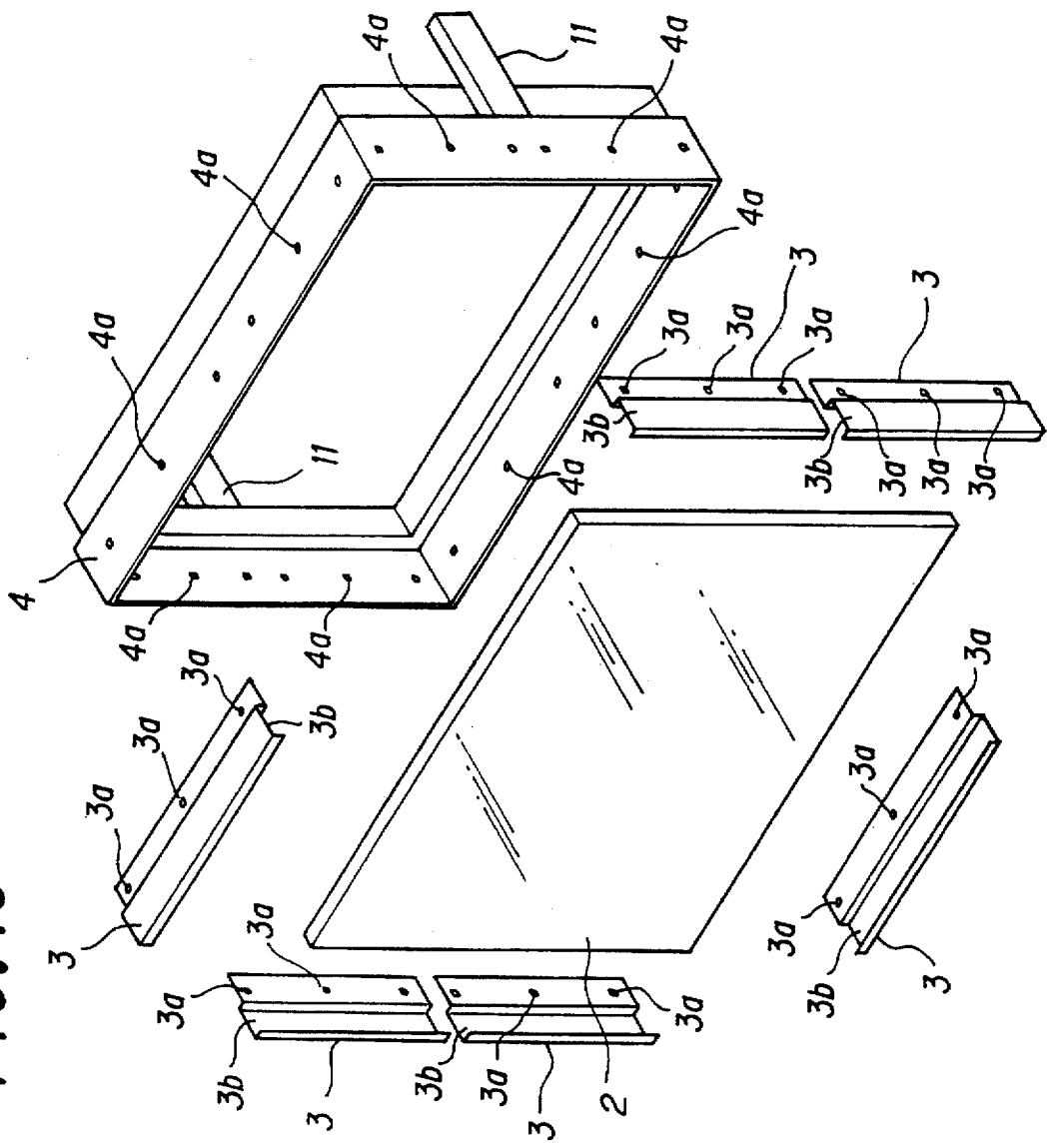
FIG. 15 is an exploded view showing a screen, screen frame and a screen holder.

FIG. 15 is an exploded view showing the screen 2, the screen frame 3, and the screen holder 4. Although not shown specifically in this figure, the screen holder 4 is connected to the screen bracket 5 by the slider 11.

The screen 2 is composed, for example, of a Fresnel lens or a lenticular lens. A beam is projected from the CRT to form an image on the screen 2. In this embodiment, two screen frames 3 are attached to each side of the screen 2 although only one upper and one lower screen frames are shown in FIG. 15 for simplicity. Each of the screen frames 3 has a screen retainer 3b at its front end. The screen retainer 3b is engaged with the edge of the screen 2. The screen frame 3 has at its rear end a plurality of holes 3a for screws with which the screen frame 3 is secured to the screen holder 4.

Figure 16:
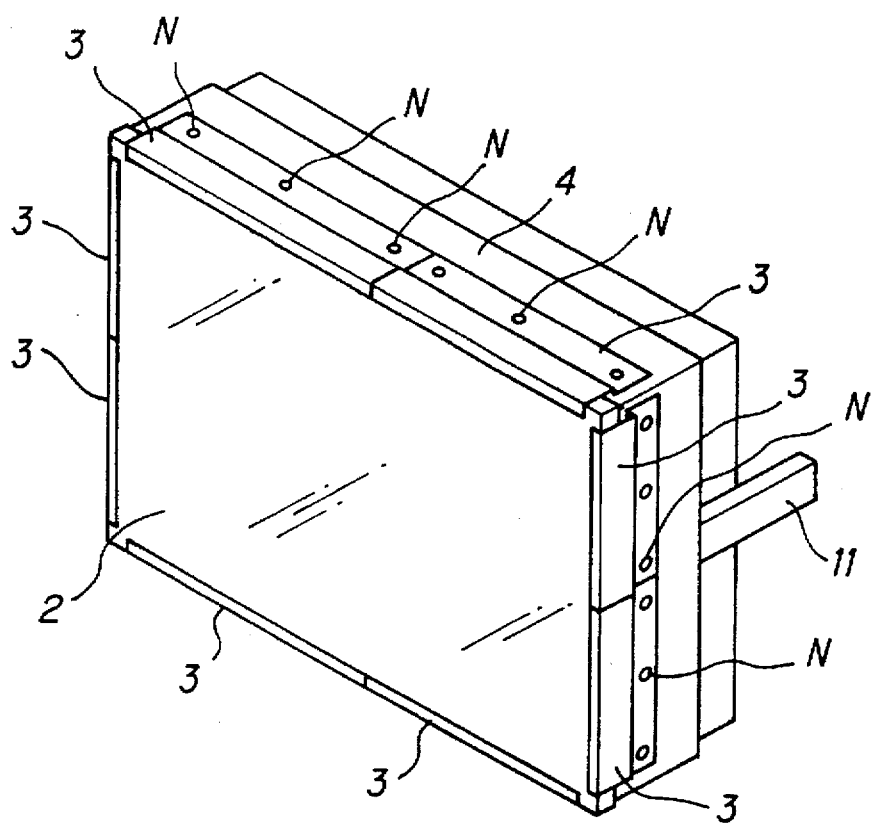
FIG. 16 is a perspective view of the screen, the screen frame, and the screen holder in an assembled state.

The screen holder 4 also includes a plurality of corresponding threaded holes 4a. As shown in FIG. 16, a plurality of screws N pass through the threaded holes 3a and 4a to secure the screen frames 3 to the screen holder 4 while the screen 2 is held by the screen frames 3. In order to replace or clean the screen 2, the screen holder 4 is slid forward in a state shown in FIG. 16. After the screen holder has been moved to a predetermined forward position, the screws N are removed to allow for removal of the screen frames 3 and thus, the screen 2.

Figure 17:
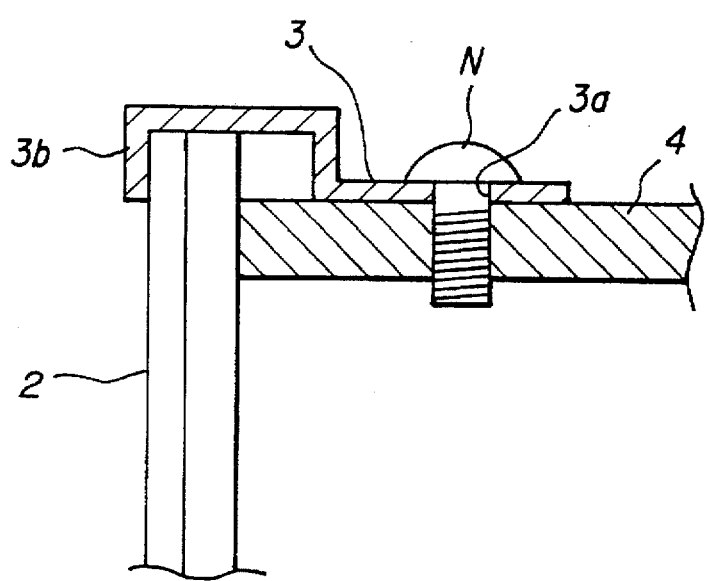
FIG. 17 is a sectional view, in part, of the screen, the screen frame and the screen holder.

FIG. 17 is an enlarged sectional view of a portion of the screen 2 held in position by the screen retainer 3b of screen frames 3 and contacted with the front end of the screen holder 4. That is, the screen 2 is sandwiched between the screen retainer 3b and the front end of the screen holder 4.

The screen 2 is thus positively fixed in position during sliding movement of the screen holder 4.

The screen frames 3 are used to directly attach the screen 2 to the screen holder 4. This enables ready attachment and detachment of the screen and eliminates the need for two kinds of screen frames 64A, 64B as required in the related art.

In the illustrated embodiment, two screen frames 3 are attached to each side of the screen 2. Alternatively, a single frame may be attached to each side of the screen 2. In such a case, the screen frame is better if it is substantially identical in length to each side of the screen 2.

As thus far described, a projector according to the present invention includes means for securing or holding a screen holder which is accessible from the front of the projector. Thus, an operator does not need to go behind the projector to unlock the means for securing a screen when a screen is to be removed for replacement or cleaning.

A slide mechanism is attached to the side of the screen holder and screen bracket. This arrangement makes the slide mechanism simple and eliminates the need for complicated drive wires and rollers.

What is claimed is:

1. A projector comprising:
a plurality of cabinets arranged in rows and columns each said cabinet having a screen located at a front end with a plurality of said screens being adapted to collectively form a display screen on which an image is formed, each said cabinet including a screen frame for holding edges of said screen, a screen holder secured to said screen by said screen frame, a screen bracket for mounting said screen holder to said cabinet, means for securing said screen holder and said screen bracket and permitting disconnection of said screen holder from said screen bracket when said screen holder is pushed rearwardly toward said screen bracket, and a slide mechanism mounted on said screen bracket and said screen holder for permitting reciprocal movement of said screen holder relative to said cabinet when said screen holder is disconnected from said screen bracket.

2. A projector according to claim 1, wherein said means for securing said screen holder to said screen bracket is a push-type joint.

3. A projector according to claim 1, wherein said means for securing said screen holder to said screen bracket is a magnetic joint.

4. A projector according to claim 1, wherein said slide mechanism is attached to sides of said screen bracket and said screen holder.

5. A projector according to claim 1, wherein said slide mechanism comprises a slider including a first fixed element mounted on said screen holder, a second fixed element mounted on said screen bracket, a core disposed between said first and second fixed elements through a plurality of bearings, and a plurality of stoppers located on said first fixed element, said second fixed element, and said core for limiting reciprocal movement of said screen holder.

6. A projector according to claim 1, wherein said slide mechanism comprises a slide shaft attached to one of said screen holder and said screen bracket and a stopper at a front end of said slide shaft, a bearing mounted on the other one of said screen holder and said screen bracket for holding said slide shaft, and rollers for facilitating sliding movement of said slide shaft, whereby said stopper limits reciprocal movement of said screen holder when brought into contact with said bearing.

* * * * *